(12) United States Patent
Dommaschk et al.

(10) Patent No.: US 8,817,440 B2
(45) Date of Patent: Aug. 26, 2014

(54) SEMICONDUCTOR PROTECTION ELEMENTS FOR CONTROLLING SHORT CIRCUITS AT THE DC END OF VOLTAGE SOURCE CONVERTERS

(75) Inventors: Mike Dommaschk, Guteborn (DE); Jörg Dorn, Buttenheim (DE); Ingo Euler, Erlangen (DE); Jörg Lang, Stadtsteinach (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 12/517,641

(22) PCT Filed: Dec. 8, 2006

(86) PCT No.: PCT/DE2006/002249
§ 371 (c)(1),
(2), (4) Date: Jun. 4, 2009

(87) PCT Pub. No.: WO2008/067786
PCT Pub. Date: Jun. 12, 2008

(65) Prior Publication Data
US 2010/0066174 A1 Mar. 18, 2010

(51) Int. Cl.
*H02H 7/00* (2006.01)
(52) U.S. Cl.
USPC .................................................. 361/93.1
(58) Field of Classification Search
USPC .......................................... 631/93.1; 361/93.1
See application file for complete search history.

(56) References Cited

U.S. PATENT DOCUMENTS

| | | | | |
|---|---|---|---|---|
| 5,729,446 | A * | 3/1998 | Gruning | 363/58 |
| 5,946,178 | A * | 8/1999 | Bijlenga | 361/91.5 |
| 7,960,871 | B2 * | 6/2011 | Dommaschk et al. | 307/151 |
| 8,144,489 | B2 * | 3/2012 | Dommaschk et al. | 363/39 |
| 8,570,779 | B2 * | 10/2013 | Dommaschk et al. | 363/53 |
| 2005/0180179 | A1 * | 8/2005 | Hirst | 363/21.07 |

FOREIGN PATENT DOCUMENTS

| | | | |
|---|---|---|---|
| DE | 10103031 | * | 7/2002 |
| DE | 10103031 A1 | | 7/2002 |
| DE | 10323220 A1 | | 12/2004 |
| DE | 10333798 A1 | | 2/2005 |
| JP | 7312878 A | | 11/1995 |
| JP | 2001078456 A | | 3/2001 |
| JP | 2001238460 A | | 8/2001 |
| JP | 2003204668 A | | 7/2003 |
| JP | 2006020405 A | | 1/2006 |

* cited by examiner

*Primary Examiner* — Stephen W Jackson
(74) *Attorney, Agent, or Firm* — Laurence A. Greenberg; Werner H. Stemer; Ralph E. Locher

(57) ABSTRACT

A device for converting an electric current includes at least one phase module having an AC terminal and at least one DC terminal. Phase module branches, each of which is equipped with serially connected submodules, are respectively provided between each DC terminal and each AC terminal. Each submodule is provided with at least one power semiconductor. Semiconductor protecting means are connected in parallel or in series to at least one of the power semiconductors to enable the device to withstand even high short-circuit currents for a sufficient period of time. A method for protecting the power semiconductors of the device, is also provided.

12 Claims, 3 Drawing Sheets

SEMICONDUCTOR PROTECTION ELEMENTS FOR CONTROLLING SHORT CIRCUITS AT THE DC END OF VOLTAGE SOURCE CONVERTERS

BACKGROUND OF THE INVENTION

Field of the Invention

The invention relates to a device for converting an electric current, comprising at least one phase module having an AC voltage connection and at least one DC voltage connection, wherein a phase module branch is formed between each DC voltage connection and each AC voltage connection, and wherein each phase module branch is provided with a series circuit formed by submodules, each having at least one power semiconductor.

Such a device is already known from DE 101 03 031 A1, which describes both a traditional voltage source converter and a voltage source converter with distributed energy storage devices. Voltage source converters with distributed or subdivided energy storage devices and the ability to switch stepped voltages are also referred to as multilevel power converters. The voltage source converter described is provided for connection to a polyphase AC voltage power supply system, wherein the power converter is connected to a second converter via a DC voltage circuit. At the AC voltage end, the second converter is connected to a further single-phase or polyphase AC voltage power supply system or to a load to be driven. For each phase of the AC voltage power supply system to be connected, the converter is provided with a phase module having one AC voltage connection for connecting the phase of the AC voltage power supply system and two DC voltage connections. Between each DC voltage connection and the AC voltage connection there extend phase module branches which, in order to obtain high voltages, comprise a series a circuit formed by turn-off power semiconductors. The turn-off power semiconductors are for example so-called IGBTs, GTOs or IGCTs. In this case, each turn-off power semiconductor has a freewheeling diode connected in parallel with it in the opposite sense. In the case of the traditional voltage source converter, a central capacitor is provided as energy storage device in the DC voltage intermediate circuit.

Instead of a central energy storage device, however, in accordance with DE 101 03 031 A1 it is also possible to distribute capacitances among series-connected submodules. Said submodules then each have a capacitor connected in parallel with power semiconductors. The power semiconductors comprise turn-off power semiconductors and freewheeling diodes that are reverse-connected in parallel with the turn-off power semiconductors. Each phase module branch of the power converter thus comprises a series circuit formed by submodules with their own energy storage devices.

In the case of the voltage source converters already known, high fault currents occur in the converter in the event of a short circuit in the DC voltage circuit, said fault currents essentially being limited by an inductance, that is to say for example by a winding arranged on the phase modules at the AC voltage end. The fault current that occurs in the case of the short circuit is driven by the power supply system voltage and is usually interrupted by the opening of a circuit-breaker that isolates the AC voltage from the converter. However, certain semiconductor designs can already be irreversibly damaged or destroyed by the time the circuit-breaker opens. In order to avoid destruction of the power semiconductors and in particular of the freewheeling diodes, the diodes have hitherto been designed in derated fashion in order to be able to withstand a predicted short-circuit current even over a relatively long time duration.

However, such a solution has not led to satisfactory results and is furthermore cost-intensive. Moreover, turn-off power semiconductors and freewheeling diodes are usually commercially offered together, for example in a common housing, such that derating the freewheeling diodes necessitates separate and cost-intensive production of the power semiconductors.

BRIEF SUMMARY OF THE INVENTION

It is an object of the invention, therefore, to provide a device of the type mentioned in the introduction which can withstand even high short-circuit currents over a sufficient time duration.

The invention achieves this object by semiconductor protection means connected in parallel and/or in series with at least one of the power semiconductors.

The invention provides one or a plurality of components for the protection of the power semiconductors. Said components are encompassed by the expression semiconductor protection means. One such component is for example a unit connected in parallel with one of the power semiconductors. Furthermore, however, the semiconductor protection means also comprise current limiting means set up for limiting the current flow through the phase module branches. Here the expression power semiconductors encompasses not only the turn-off power semiconductors, that is to say IGBTs, GTOs, IGCTs or the like, but also the freewheeling diodes that are usually connected in parallel with the turn-off power semiconductors.

Expediently, each submodule has at least one turn-off power semiconductor with which there is connected in parallel a freewheeling diode that is connected in the opposite sense, wherein the semiconductor protection means comprise a protection element connected in parallel with the freewheeling diode that is connected in the opposite sense.

Advantageously, the protection element is a further freewheeling diode having a current-carrying capacity adapted to the short-circuit current to be expected. In accordance with this advantageous further development, the actual freewheeling diode has an additional freewheeling diode connected in parallel with it. The current flow in the event of a short circuit is therefore accepted by both freewheeling diodes. The static forward characteristic curve of the freewheeling diode serving as a protection element is set up in relation to the already integrated freewheeling diode such that the protection element accepts a significant proportion of the fault current in the event of a fault and thus relieves the load on the integrated freewheeling diode. Furthermore, the surge current capacity of the freewheeling diode acting as a protection element is adapted to the loadings to be expected. During normal operation, the current flowing via the respective phase module branch is divided between the integrated freewheeling diode and the freewheeling diode acting as a protection element, wherein said division is dependent on the static forward characteristic curve of the two freewheeling diodes. Consequently, upon commutation of the current during normal operation, both freewheeling diodes are also loaded, for which reason the freewheeling diode acting as a protection element has requirements with regard to the specified turn-off behavior.

In the exemplary embodiment of the invention that departs from this, the protection element is a thyristor. The latter is switched off during normal operation, such that a current flow via the thyristor is impossible. A short circuit can be detected by a voltage or current sensor in the DC voltage circuit, at the AC connection, or by measuring the branch current via the phase module branch. In the context of the invention, however, the short circuit is detected in any manner desired. In one configuration of the invention, one or a plurality of said measurement sensors is or are connected to an evaluation unit, which, on the basis of a logic implemented therein, ascertains the short-circuit situation and subsequently generates a signal for triggering the thyristor or thyristors. For this purpose, the evaluation unit compares for example the measured current with the threshold current and ascertains the short-circuit situation upon the threshold current being exceeded for a relatively long time. Afterward, within a time duration of the order of magnitude of microseconds, the turn-off power semiconductors are transferred into their turned-off position. The short-circuit current can then only flow via the parallel-connected freewheeling diodes. By means of a subsequent signal from the evaluation unit, the thyristor is transferred from its turned-off position into its turned-on position, in which a current flow via the thyristor is enabled. Therefore, the short-circuit current then flows both via the thyristor and via the integrated freewheeling diode. The static forward characteristic curve of the thyristor is configured such that the latter accepts a significant proportion of the fault short-circuit current, such that the load on the integrated freewheeling diode is relieved. The periodic switching of the turn-off power semiconductors connected in parallel with the thyristor acting as a protection element must not lead to undesirable triggering of the thyristor during normal operation. Self-triggering of the thyristor would be initiated by an excessively high rate of rise of voltage for example. Therefore, the thyristor must have a sufficient so-called du/dt capability.

Advantageously, the semiconductor protection means comprise inductances arranged in each phase module. The arrangement of the inductances within the phase module is in principle in any manner desired. Thus, by way of example, each phase module is connected to one or each of the DC voltage connections via the inductances. In this case, the inductance is part of the phase module.

Advantageously, the inductances are arranged between the series circuit at the submodules and the AC voltage connection. Consequently, each phase module branch is connected to the AC voltage connection by means of the inductances. The inductances of the phase module branches of the same phase module are consequently arranged adjacent to one another, wherein the AC voltage connection is arranged between the inductances. The inductances can therefore also be inductively coupled to one another, whereby the total inductance for circulating currents between the phase modules and the DC component of the branch current is increased and the individual inductances are designed to be smaller with a cost saving if the circulating currents can be critical for the dimensioning.

In a further configuration of the invention, the semiconductor protection means comprise inductances arranged in the submodules. In this case, by way of example, each submodule has an inductance. In a departure from this, only one submodule or only some submodules has or have an inductance. In accordance with this variant of the invention, the inductances are arranged in distributed fashion in the phase module.

Finally, it is possible in the context of the invention for the semiconductor protection means to comprise inductances arranged in the DC voltage circuit. In this case, the inductances are arranged in direct physical proximity to the phase modules, such that a fault current that has been initiated by a short circuit in the DC voltage intermediate circuit is forced to flow via the inductances of the DC voltage circuit.

Expediently, the semiconductor protection means comprise inductances arranged at the AC end of the phase modules. In a further variant, the semiconductor protection means comprise transformer windings. The transformer windings are equipped with a leakage inductance that suffices for effective current limiting.

Advantageously, each submodule has a first connection terminal, a second connection terminal, an energy storage device and a power semiconductor branch connected in parallel with the energy storage device, said power semiconductor branch having two series-connected turn-off power semiconductors, wherein a freewheeling diode that is connected in the opposite sense is connected in parallel with each turn-off power semiconductor and the junction point of the emitter of a first turn-off power semiconductor of the power semiconductor branch and the anode of the freewheeling diode that is connected in the opposite sense and is assigned to the first turn-off power semiconductor forms the first connection terminal and the junction point of the turn-off power semiconductor of the power semiconductor branch and the freewheeling diodes forms the second connection terminal.

In a departure from this, each submodule has a first connection terminal, a second connection terminal, an energy storage device and a power semiconductor branch connected in parallel with the energy storage device, said power semiconductor branch having two series-connected turn-off power semiconductors, wherein a freewheeling diode that is connected in the opposite sense is connected in parallel with each turn-off power semiconductor and the junction of the collector of a first turn-off power semiconductor of the power semiconductor branch and the cathode of the freewheeling diode that is connected in the opposite sense and is assigned to the first turn-off power semiconductor forms the first connection terminal and the junction point of the turn-off power semiconductor of the power semiconductor branch and the freewheeling diodes forms the second connection terminal.

The invention also relates to a method for protecting power semiconductors of such a device, wherein a short circuit is detected at the DC voltage end of the phase module by measurement sensors, and after the short-circuit current has been detected, the turn-off power semiconductors are transferred into their disconnected position and a thyristor as a semiconductor protection element is subsequently transferred into its on-state position.

BRIEF DESCRIPTION OF THE SEVERAL VIEWS OF THE DRAWING

Further expedient configurations and advantages of the invention are the subject of the following description of exemplary embodiments with reference to the figures of the drawing, wherein identical reference symbols refer to identically acting structural parts, and wherein.

DESCRIPTION OF THE INVENTION

Figure 1:
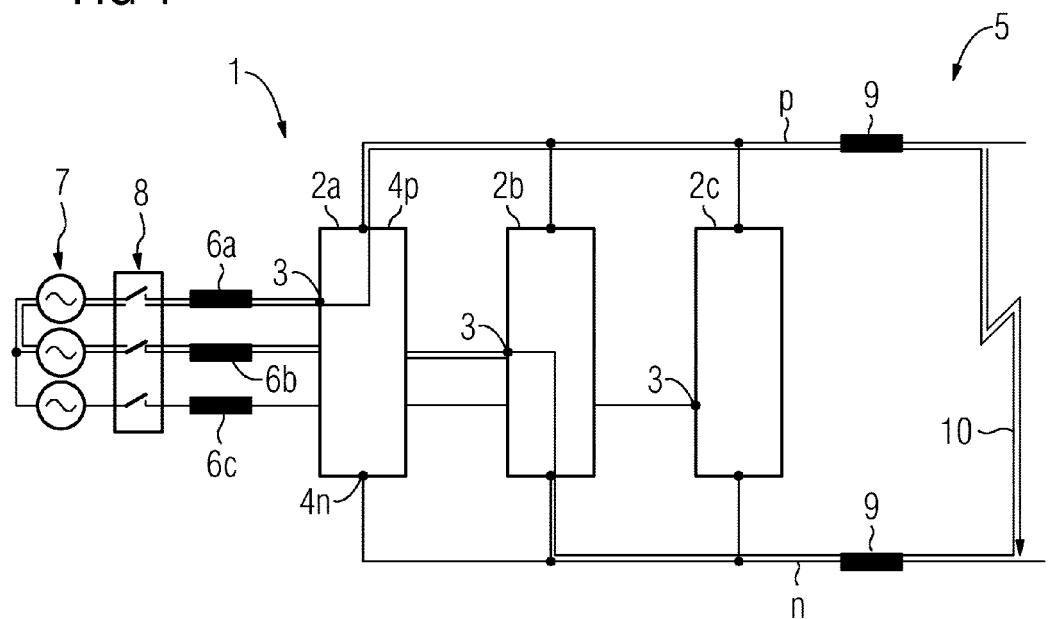
FIG. 1 shows a schematic illustration of an exemplary embodiment of the device according to the invention illustrating the path of a fault current in the event of a short circuit.

FIG. 1 shows an exemplary embodiment of the device 1 according to the invention in a schematic illustration. The device shown has three phase modules 2a, 2b and 2c, which can respectively be connected to a phase of the AC voltage power supply system 7. For this purpose, each phase module 2a, 2b and 2c has an AC voltage connection 3. Furthermore, each phase module 2a, 2b, 2c is provided with a positive DC voltage connection p and a negative DC voltage connection n, which is connected to the positive pole of a DC voltage intermediate circuit 5 and to the negative pole of the DC voltage intermediate circuit 5 respectively.

The phase modules 2a, 2b, 2c each comprise two phase module branches each extending between the AC voltage connection 3 and one of the DC voltage connections p or n, respectively. Overall, six phase module branches are provided in the exemplary embodiment illustrated. Each phase module branch has a series circuit formed by submodules with turn-off power semiconductors.

The connection to the AC voltage power supply system 7, which is illustrated as an ideal voltage source is effected via a transformer, for example. Furthermore, additional inductances can be arranged between said transformer and the AC voltage connection 3. The leakage inductances of the transformer, the additional inductances and the impedance of the AC voltage power supply system 7 are illustrated in FIG. 1 by the inductances 6a, 6b, 6c arranged at the AC voltage end of the phase modules 2a, 2b and 2c. A three-pole circuit-breaker 8 is connected between the AC voltage power supply system 7 and the inductances 6a, 6b, 6c, said circuit-breaker being connected to a protection unit equipped with measurement sensors for detecting the current flow of the phase modules at the AC voltage end. If the detected current exceeds a predefined threshold current, the circuit-breaker 8 is switched, wherein each pole of the circuit-breaker 8 is transferred into its disconnected position, in which a current flow via the circuit-breaker 8 is interrupted.

Inductances 9 are arranged in the DC voltage circuit 5, to be precise both in the positive pole p of the DC voltage circuit 5 and in the negative pole n.

FIG. 1 furthermore illustrates an exemplary path of a short-circuit current 10 driven from the AC voltage power supply system 7, which short-circuit current would occur in the case of a short circuit in the DC voltage circuit 5. It can be discerned that the short-circuit current 10 flows out of the AC voltage power supply system 7 via the circuit-breaker 8, the inductance 6a, the power semiconductors of the phase module 2a, the inductances 9 in the positive and negative pole n of the DC voltage circuit 5, the power semiconductors of the phase module 2b, the inductance 6b, and finally into the AC voltage power supply system 7 again. The inductances 9 arranged in the DC voltage circuit 5 consequently limit the short-circuit current 10 and serve as semiconductor protection means in the context of the invention.

Figure 2:
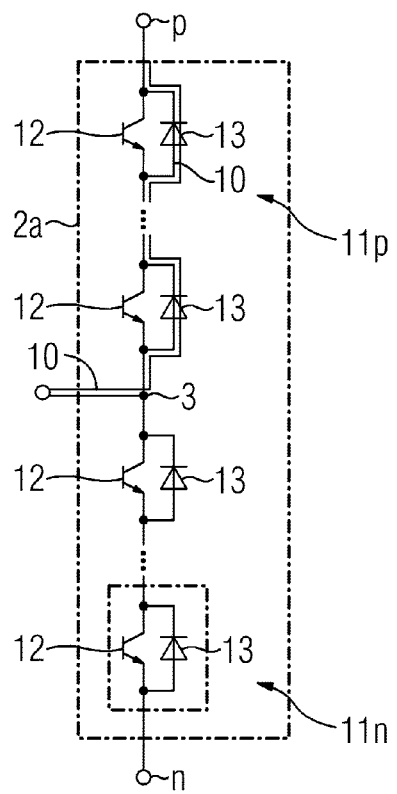
FIG. 2 shows a phase module of an exemplary embodiment of the device according to the invention with a so-called two-point topology.

FIG. 2 shows a phase module 2a using two-point technology, wherein the path of a short-circuit current 10 via the sensitive power semiconductors is again illustrated. It should be pointed out that all the turn-off power semiconductors were transferred into their disconnected position directly after detection of the short circuit by expedient measurement sensors connected to an evaluation unit. It can be discerned in FIG. 2 that the phase module 2a is composed of two phase module branches 11p and 11n. In this case, the phase module branch 11p extends between the AC voltage connection 3 and the positive DC voltage connection p, and the phase module branch 11n extends between the AC voltage connection 3 and the negative DC voltage connection n. Each of the phase module branches 11p, 11n again has a series circuit formed by submodules, wherein each submodule has a turn-off power semiconductor 12 and a freewheeling diode 13 reverse-connected in parallel with the turn-off power semiconductor. The dotted line in each phase module branch is intended to indicate that the number of submodules and hence of the turn-off power semiconductors 12 and of the freewheeling diodes 13 for each phase module branch 11p and 11n, respectively, is not in any way limited to two, but rather can be extended as desired depending on the voltage present.

Short-circuit current described in connection with FIG. 1 would thus flow via the AC voltage connection 3 of the phase module 2a and via all the freewheeling diodes 13 of the phase module branch 11p to the positive pole of the DC voltage circuit 5. Consequently, the freewheeling diodes 13 of the phase module branch 11p and the freewheeling diodes of the phase module branch 11n of the phase module 2b would be exposed to the high short-circuit currents and could be damaged before the release of the circuit-breaker 8.

A device according to the invention in accordance with FIG. 1 having a phase module in accordance with FIG. 2 comprises a semiconductor protection means (not illustrated in the figures) preferably in the form of a thyristor or a diode connected in parallel with a power semiconductor, in particular a freewheeling diode, which is loaded with the short-circuit current when turn-off power semiconductors are turned off. Furthermore, the device comprises a central energy storage device (likewise not shown), for example in the form of a capacitor, which is connected to the converter of the device in a low-impedance manner.

Figure 3:
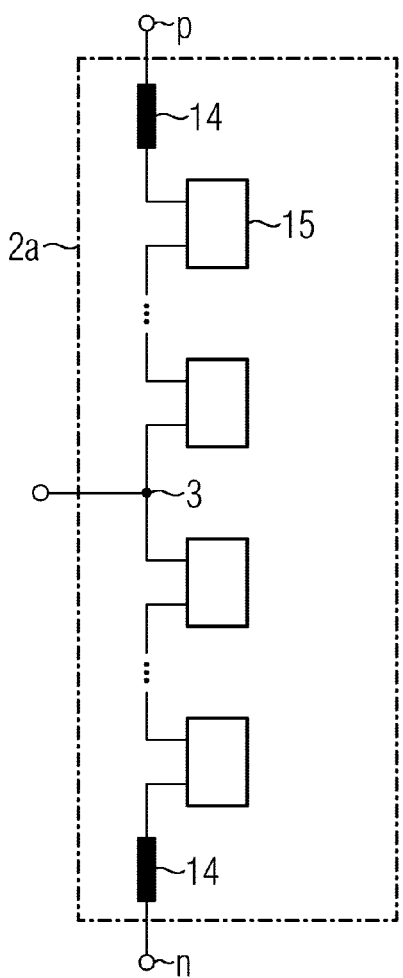
FIG. 3 shows a phase module of an exemplary embodiment of the device according to the invention with a so-called multilevel topology.

FIG. 3 shows a phase module 2a of a so-called multilevel converter, which is likewise an exemplary embodiment of the device according to the invention. In multilevel technology, the phase module 2a comprises a series circuit formed by submodules 15, each having an energy storage device, such that it is possible to produce gradated voltage profiles by turning on and turning off the submodules in the series circuit. On account of the decentralized arrangement of the energy storage devices in the phase module, it is possible to equip the phase module 2a with an additional inductance 14 connected between the DC voltage connection p and n, respectively, and the respective series circuit formed by bipolar submodules 15. The additional inductances limit the short-circuit current. However, an arrangement of the inductances in the phase modules is advantageous only in the case of multilevel technology. In the case of converters having a central energy storage device, however, the inductances in the phase module have an adverse effect on the switching behavior.

Figure 4:
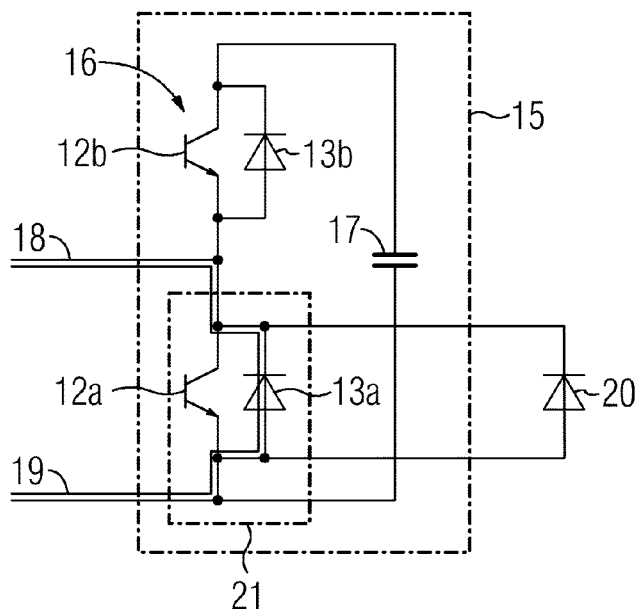
FIG. 4 shows an equivalent circuit diagram illustration of a submodule of the phase module in accordance with FIG. 3.

FIG. 4 shows an equivalent circuit diagram of the submodule 15 in accordance with FIG. 3. It can be discerned that each submodule 15 has two turn-off power semiconductors 12, such as IGBTs, for example. Once again a freewheeling diode 13 is reverse-connected in parallel with each turn-off power semiconductor 12. A series circuit 16 comprising the turn-off power semiconductors 12 is formed in this way. An energy storage device embodied as a capacitor 17 is connected in parallel with the series circuit 16.

Each submodule 15 has a first connection terminal 18 and a second connection terminal 19. A first power semiconductor 12a is arranged between the connection terminals 18 and 19, respectively. In FIG. 4, the power semiconductor 12b is arranged above the turn-off power semiconductor 12a. After a short circuit has been detected, firstly the turn-off power semiconductors are transferred into their disconnected position. The short-circuit current therefore flows via the lower freewheeling diode 13a. By contrast, the freewheeling diode 13b is not impaired by the short-circuit current. For this reason, a protection element 20 is connected in parallel only with the lower freewheeling diode 13a. The protection element 20 is a further freewheeling diode, wherein the latter has a forward characteristic curve which, in relation to the integrated diode 13a, is such that a significant proportion of the short-circuit current flows via the freewheeling diode 20 in the event of a fault. The freewheeling diode 20 furthermore has a sufficiently high surge current-carrying capacity. During normal operation, the current flows via the freewheeling diode 13a and via the freewheeling diode 20 acting as a protection element. The division is dependent on the static forward characteristic curves of the two freewheeling diodes 13a and 20, respectively. During commutation, the freewheeling diode 20 is therefore also loaded, which diode must therefore have a corresponding suitability with regard to the turn-off behavior. Such freewheeling diodes are known to the person skilled in the art, however, and therefore a more detailed description of the diode properties can be omitted at this point.

There are commercially available in particular turn-off power semiconductors 12a with freewheeling diodes 13a connected in the opposite sense, which are arranged in a common housing, which is designated by 21 in FIG. 4. The protection element, that is to say the freewheeling diode 20 in this case, is arranged outside the housing 20.

Figure 5:
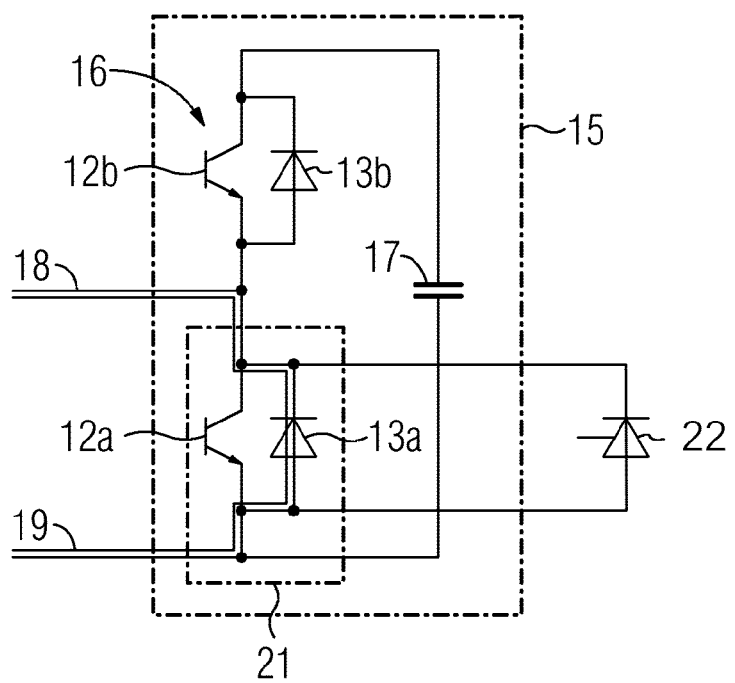
FIG. 5 shows another embodiment of an equivalent circuit diagram illustration of a submodule of the phase module in accordance with FIG. 3.

FIG. 5 shows another embodiment of an equivalent circuit diagram of the submodule 15 in accordance with FIG. 3. More particularly, the submodule 15 of FIG. 5 is substantially similar to the submodule 15 of FIG. 4, with like reference numerals denoting like items. However, in FIG. 5, the freewheeling diode 20 of FIG. 4 has been replaced by a different protection element, i.e., thyristor 22, connected in parallel with the first power semiconductor 12a and the lower freewheeling diode 13a.

It goes without saying that, in the context of the invention, inductances 14 in the phase module 2a, 2b, 2c or inductances 9 in the DC voltage circuit 5 can be present in addition to the protection elements 20 or 21.

Moreover, it is also possible in the context of the invention for the submodules 15 at least in part to have an inductance.

If a short circuit occurs in the DC voltage intermediate circuit in the case of the converter having a multilevel topology in accordance with FIGS. 3 and 4, the branch current via the phase module 2a rises at a rate that is essentially determined by the inductance 14. If the short circuit occurs at the DC voltage end of the inductances 9 in the DC voltage circuit, these also limit the rate of current rise. The inductances 14 are designed for example such that in the case of a short circuit, the turn-off power semiconductors can still be turned off within the permissible normal current range of the turn-off power semiconductors. For this reason, fast detection and reaction are provided, of the order of magnitude of a few microseconds. After the turn-off power semiconductors have been turned off, only the freewheeling diodes then carry the short-circuit current. When thyristors are used as a protection element, they should be triggered after a few milliseconds.

The invention claimed is:

1. A device for converting an electric current, the device comprising:
   at least one phase module having an AC voltage connection, at least one DC voltage connection, and at least one phase module branch respectively disposed between each said at least one DC voltage connection and said AC voltage connection;
   said at least one phase module branch each including a series circuit of submodules, each submodule including at least one turn-off power semiconductor and a freewheeling diode reverse connected in parallel with said at least one turn-off power semiconductor;
   said at least one semiconductor protection device including a freewheeling diode or thyristor connected in parallel with said freewheeling diode reverse connected in parallel with said at least one turn-off power semiconductor;
   each of said submodules additionally including a first connection terminal, a second connection terminal, an energy storage device and a power semiconductor branch connected in parallel with said energy storage device, said energy storage device connected to said power semiconductor branch in both directions by low resistant and low inductive current path;
   said at least one turn-off power semiconductor including first and second series-connected turn-off power semiconductors of said power semiconductor branch each having an emitter;
   freewheeling diodes each reverse connected in parallel with a respective one of said turn-off power semiconductors and each having an anode;
   a junction point of said emitter of said first turn-off power semiconductor of said power semiconductor branch and said anode of said freewheeling diode assigned to said first turn-off power semiconductor, forms said first connection terminal; and
   a junction point of said turn-off power semiconductors of said power semiconductor branch and said freewheeling diodes forms said second connection terminal.

2. The device according to claim 1, wherein said protection element is a freewheeling diode having a current-carrying capacity adapted to a short-circuit current to be expected.

3. The device according to claim 1, wherein said protection element is a thyristor.

4. The device according to claim 1, wherein said at least one semiconductor protection device includes inductances disposed in each of said at least one phase module.

5. The device according to claim 4, wherein said inductances are disposed in one or a plurality of said submodules.

6. The device according to claim 1, wherein said at least one semiconductor protection device includes inductances disposed at an AC voltage end of said at least one phase module.

7. The device according to claim 6, wherein said inductances are transformer windings having a leakage inductance that suffices for current limiting.

8. The device according to claim 1, wherein said at least one semiconductor protection device includes inductances connected to one or to each of said at least one DC voltage connection at a DC voltage end.

9. A device for converting an electric current, the device comprising:
   at least one phase module having an AC voltage connection, at least one DC voltage connection, and at least one phase module branch respectively disposed between each said at least one DC voltage connection and said AC voltage connection;
   said at least one phase module branch each including a series circuit of submodules, each submodule including at least one turn-off power semiconductor and a freewheeling diode reverse connected in parallel with said at least one turn-off power semiconductor;

said at least one semiconductor protection device including a freewheeling diode or thyristor connected in parallel with said freewheeling diode reverse connected in parallel with said at least one turn-off power semiconductor;

each of said submodules additionally including a first connection terminal, a second connection terminal, an energy storage device and a power semiconductor branch connected in parallel with said energy storage device;

said at least one turn-off power semiconductor including first and second series-connected turn-off power semiconductors of said power semiconductor branch each having a collector, said energy storage device being connected directly to said power semiconductor branch including said first and second series-connected turn-off power semiconductors, in parallel;

freewheeling diodes each reverse connected in parallel with a respective one of said turn-off power semiconductors and each having a cathode;

a junction point of said collector of said first turn-off power semiconductor of said power semiconductor branch and said cathode of said freewheeling diode assigned to said first turn-off power semiconductor, forms said first connection terminal; and a junction point of said turn-off power semiconductors of said power semiconductor branch and said freewheeling diodes forms said second connection terminal.

10. A method for protecting power semiconductors of a device for converting an electric current, the method which comprises the following steps:

detecting a short circuit at a DC voltage end of the at least one phase module according to claim 3 with measurement sensors; and after detecting the short-circuit current, transferring the at least one power semiconductor in the form of turn-off power semiconductors, into a disconnected position and subsequently transferring the thyristor into an on-state position.

11. The device according to claim 9, wherein said protection element is a freewheeling diode having a current-carrying capacity adapted to a short-circuit current to be expected.

12. The device according to claim 9, wherein said protection element is a thyristor.

* * * * *